United States Patent
Choi et al.

(10) Patent No.: US 8,149,343 B2
(45) Date of Patent: Apr. 3, 2012

(54) DISPLAY DEVICE AND METHOD OF MANUFACTURING THE SAME

(75) Inventors: Nak-Cho Choi, Seoul (KR); Sung-Woon Kim, Suwon-si (KR); Hee-Keun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 12/491,919

(22) Filed: Jun. 25, 2009

(65) Prior Publication Data

US 2010/0128188 A1 May 27, 2010

(30) Foreign Application Priority Data

Nov. 27, 2008 (KR) ................ 10-2008-0118927

(51) Int. Cl.
*G02F 1/1335* (2006.01)
(52) U.S. Cl. ................... 349/15; 349/175; 349/176
(58) Field of Classification Search .............. 349/15, 349/115, 175, 176
See application file for complete search history.

(56) References Cited

U.S. PATENT DOCUMENTS 7,394,506 B2 * 7/2008 Cirkel et al. ............. 349/15
7,787,064 B2 * 8/2010 Kwon et al. ............. 349/15

FOREIGN PATENT DOCUMENTS

| JP | 2003-295117 | 10/2003 |
| JP | 2007-121720 | 5/2007 |
| KR | 1020050017103 | 2/2005 |

* cited by examiner

*Primary Examiner* — Michael Caley
(74) *Attorney, Agent, or Firm* — H.C. Park & Associates, PLC

(57) ABSTRACT

The present invention relates to a display device having an image-emitting panel and an image dividing sheet. The image-emitting panel includes a light-blocking layer, a lower substrate, an upper substrate and an electro-optic layer. The lower substrate includes pixel electrodes into which a first image signal and a second image signal having different viewing angles are applied in a spatial dividing method. The electro-optic layer reflects a circularly polarized light towards the upper substrate. The image dividing sheet includes a first optical element and a second optical element. The first optical element converts the circularly polarized light into a first light corresponding to the first image signal. The second optical element converts the circularly polarized light into a second light corresponding to the second image signal.

18 Claims, 10 Drawing Sheets

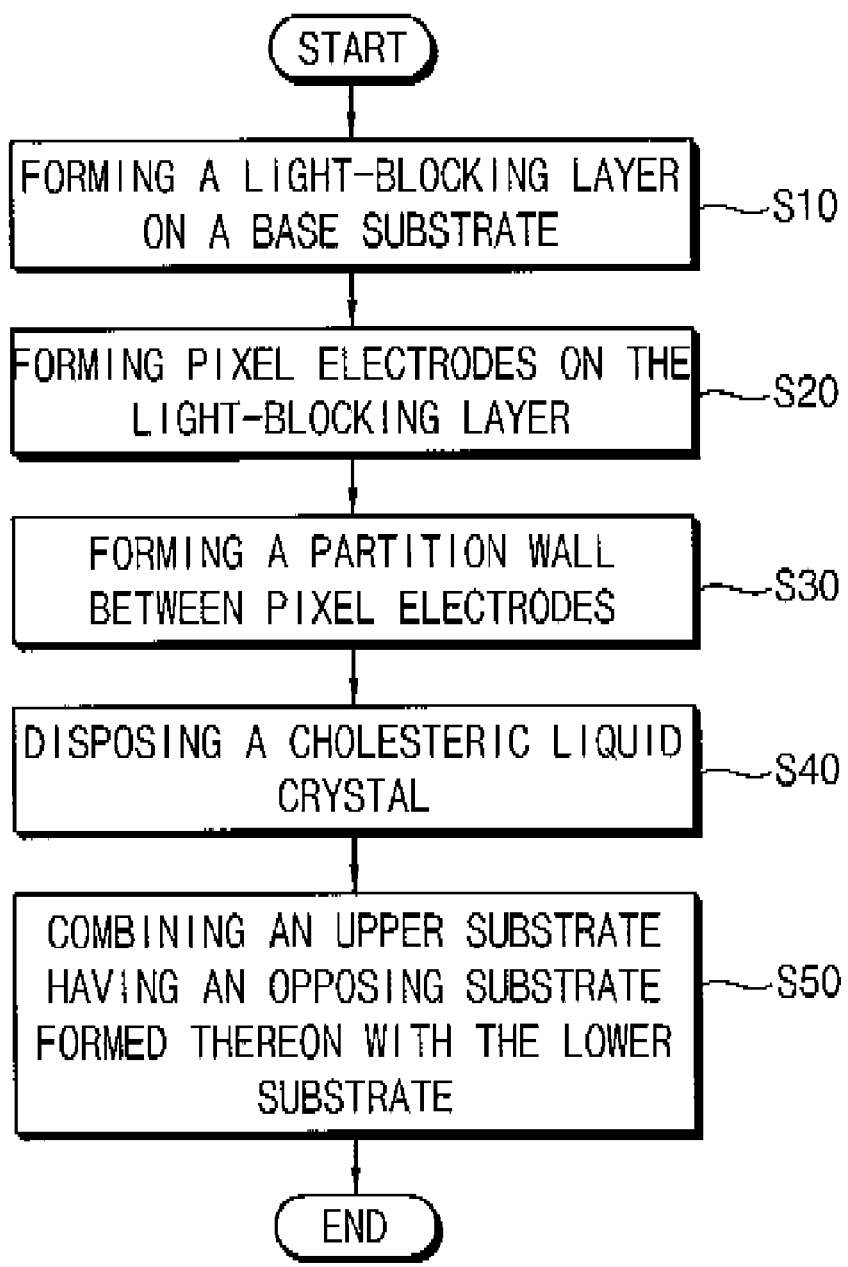

DISPLAY DEVICE AND METHOD OF MANUFACTURING THE SAME

CROSS REFERENCE TO RELATED APPLICATIONS

This application claims priority from and the benefit of Korean Patent Application No. 10-2008-0118927, filed on Nov. 27, 2008, which is hereby incorporated by reference for all purposes as if fully set forth herein.

BACKGROUND OF THE INVENTION

1. Field of the Invention

Embodiments of the present invention relate to a display device and a method for manufacturing the display device. In particular, embodiments of the present invention relate to a reflective-type display device displaying a 3-dimensional (3-D) image and a method for manufacturing the display device.

2. Discussion of the Background

Stereopsis (i.e., a stereoscopic view), commonly known as depth perception, can generally be defined as a visual and sensory ability to determine distances including determining a difference between at least two distinct distances. A 3-D display device can be defined, in general, as a display device capable of providing a viewer with stereopsis. Because the 3-D display device provides a viewer with an enhanced experience and image quality, 3-D displays can be used in various applications, such as educational, professional, and entertainment applications (e.g., movies, games, flight simulation, telemedicine, etc.).

Conventionally, when a viewer views an object which is described from a predetermined distance through two eyes, the two different images correspond to a perspective plane normally obtained by the viewer. In order to provide the viewer with a stereoscopic view, two different images may be provided to each eye of the viewer. However, the two different images may correspond to two perspective planes.

A 3-D display device provides the viewer's eyes with two perspective planes, and a stereoscopic view is realized by using spectacles with a polarizing shutter alternately disposed thereon.

To provide two perspective planes, a spatial dividing method and a temporal dividing method can be used. For example, a panel can have a plurality of pixels to display an image. In the spatial dividing method, the plurality of pixels can be spatially divided to display two perspective planes that are different from one another. In the temporal dividing method, two perspective planes can be alternately emitted using a time difference.

Since a conventional 3-D display device is a transmissive-type display device, the 3-D display device includes a backlight unit additionally. However, the transmissive-type 3-D display device suffers from problems such as large noise, large power consumption, large weight, large thickness, and/or large volume.

SUMMARY OF THE INVENTION

Exemplary embodiments of the present invention provide a reflective-type display device displaying a 3-D image and a method of manufacturing the above-mentioned display device.

Additional features of the exemplary embodiments will be set forth in the description which follows, and in part will be apparent from the description, or may be learned by practice of the invention.

An exemplary embodiment of the present invention discloses a display device for displaying an image. The display device comprises a first panel and a second panel. The first panel comprises a light-blocking layer, a lower substrate, an upper substrate and an electro-optic layer. The lower substrate is disposed on the light-blocking layer. The lower substrate comprises a plurality of pixel electrodes to which a first image signal and a second image signal are applied in a spatial dividing method. The first image signal corresponds to a first viewing angle of the image and the second image signal corresponds to a second viewing angle of the image. The second viewing angle is different than the first viewing angle. The upper substrate comprises an opposing electrode being opposite to the plurality of pixel electrodes. The electro-optical layer is arranged between the plurality of pixel electrodes and the opposing electrode. The electro-optical layer reflects a polarized light signal. The second panel receives the reflected polarized light signal. The second panel comprises a first optical element and a second optical element. The first optical element converts the reflected polarized light signal into a first light corresponding to the first image signal. The second optical element is alternately arranged relative to the first optical element. The second optical element converts the reflected polarized light signal into a second light corresponding to the second image signal.

An exemplary embodiment of the present invention discloses a display device for displaying an image. The display device comprises a first panel and an image dividing sheet. The first panel comprises a light-blocking layer, a lower substrate, an upper substrate and an electro-optical layer. The lower substrate is disposed on the light-blocking layer. The lower substrate comprises a plurality of pixel electrodes to which a first image signal and a second image signal are applied in a temporal dividing method. The first image signal corresponds to a first viewing angle of the image and the second image signal corresponds to a second viewing angle of the image. The second viewing angle is different than the first viewing angle. The upper substrate comprises an opposing electrode being opposite to the plurality of pixel electrodes. The electro-optical layer is arranged between the plurality of pixel electrodes and the opposing electrode. The electro-optical layer reflects a polarized light signal. The image dividing sheet converts a circularly polarized light corresponding to the first image signal into a first light, and converts a circularly polarized light corresponding to the second image signal into a second light. A phase of the second light is different from a phase of the first light.

An exemplary embodiment of the present invention discloses a method of manufacturing a display device. In the method, a light-blocking layer is disposed on a base substrate. A plurality of pixel electrodes to which a first image signal and a second image signal are applied in a spatial dividing method is disposed on the light-blocking layer. The first image signal corresponds to a first viewing angle of the image and the second image signal corresponds to a second viewing angle of the image. The second viewing angle is different than the first viewing angle. An upper substrate including an opposing electrode being opposite to the pixel electrodes is prepared. An electro-optic layer is arranged between the pixel electrodes and the opposing electrode to complete a first panel. The electro-optic layer reflects a polarized light signal. A second substrate receiving the reflected polarized light signal is disposed on the first substrate. The second substrate includes a first optical element to convert the reflected polarized light signal into a first light corresponding to the first image signal and a second optical element being alternately arranged relative to the first optical element. The second optical element converts the reflected polarized light signal into a second light corresponding to the second image signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 is a flowchart illustrating a method of manufacturing the display device of FIG. 1 according to an exemplary embodiment of the invention.

DETAILED DESCRIPTION OF THE ILLUSTRATED EMBODIMENTS

Figure 1:
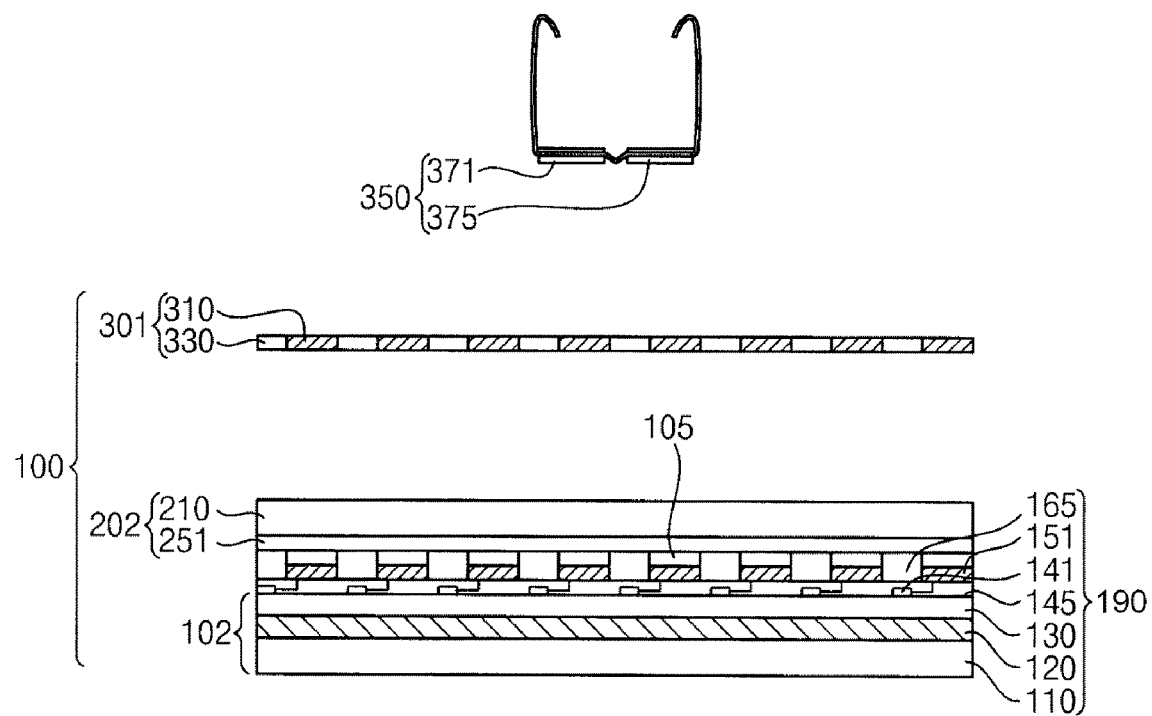
FIG. 1 is a cross-sectional view of a display device according to an exemplary embodiment of the invention.

Embodiments of the present invention are described more fully hereinafter with reference to the accompanying drawings, in which exemplary embodiments of the invention are illustrated. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the sizes and relative sizes of layers and regions may be exaggerated for clarity. Like reference numerals in the drawings denote like elements.

It will be understood that when an element or layer is referred to as being "on," "connected to" or "coupled to" another element(s) or layer(s), the element or layer can be directly on, connected to, or coupled to the other element or layer(s) or intervening elements or layers may be present. In contrast, when an element is referred to as being "directly on," "directly connected to" or "directly coupled to" another element or layer, there may be no intervening elements or layers present. As used herein, the term "and/or" includes any and all combinations of one or more of the associated listed items.

It will be understood that although the terms first, second, third etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiment The terminology used herein is for the purpose of describing particular example embodiments and is not intended to be limiting of the present invention. As used herein, the singular forms "a," "an" and "the" can include the plural forms as well, unless the context clearly indicates otherwise. It will be further understood that the terms "comprises" and/or "comprising," when used in this specification, can specify the presence of stated features, integers, steps, operations, elements, and/or components, but do not necessarily preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result of, for example, manufacturing techniques and/or tolerances, are to be expected. Thus, exemplary embodiments of the present invention should not be construed as limited to the particular shapes of regions illustrated herein but can include deviations in shapes that result from, for example, manufacturing. For example, an implanted region illustrated as a rectangle may, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a cross-sectional view of a display device 100 according to an exemplary embodiment of the present invention. Examples of display device 100 include a liquid crystal display (LCD). In some cases, display device 100 may be an active-matrix LCD and can include a plurality of pixels arranged in a matrix.

Referring to FIG. 1, a display device 100 can include an image-emitting panel 190 and an image dividing sheet 301.

The image-emitting panel 190 can emit circularly polarized light to the image dividing sheet 301. The image dividing sheet 301 can divide the circularly polarized light into a first light including a first image signal and a second light including a second image signal. The first and second light are received by polarizing spectacles 350 which can linearly polarize the first and second lights to provide a viewer with two images. Consequently, by receiving two images via the left and right eyes, a viewer can view the display in 3-D.

FIG. 2 is a flowchart illustrating a method of manufacturing the display device 100 of FIG. 1. FIGS. 3A to 3J are cross-sectional views illustrating the method of manufacturing shown in FIG. 2.

Figure 3A:
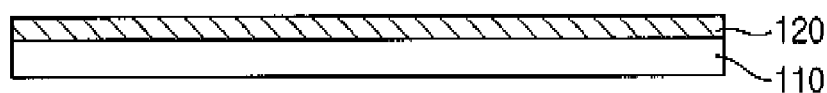
FIG. 3A, FIG. 3B, FIG. 3C, FIG. 3D, FIG. 3E, FIG. 3F, FIG. 3G, FIG. 3H, FIG. 3I, and FIG. 3J are cross-sectional views illustrating a process for manufacturing the display device of FIG. 1 according to an exemplary embodiment of the invention.
Figure 3B:
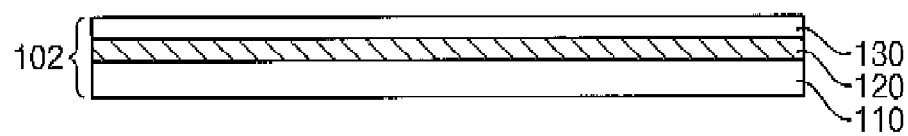
Figure 3C:
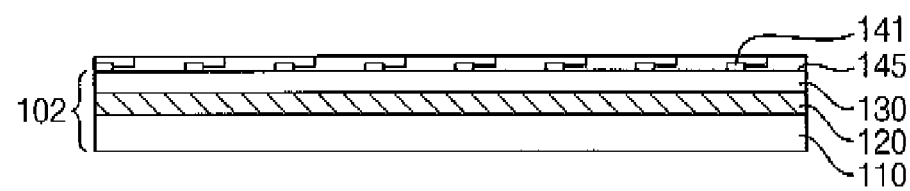
Figure 3D:
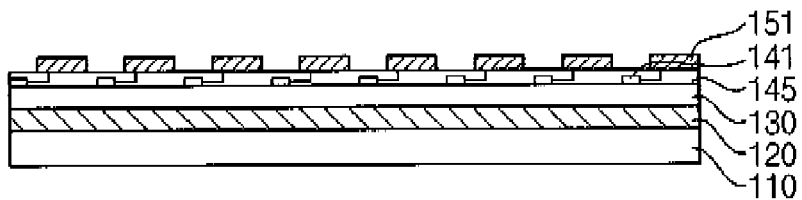
Figure 3E:
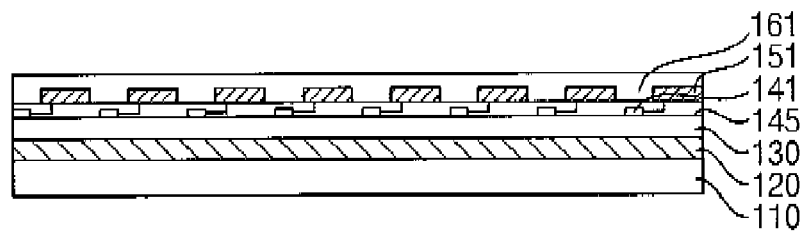
Figure 3F:
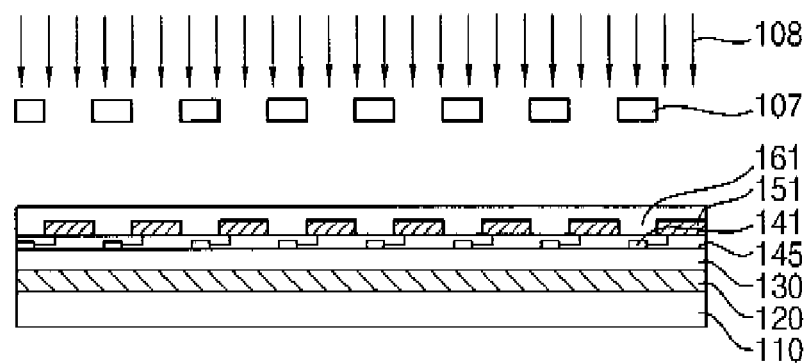
Figure 3G:
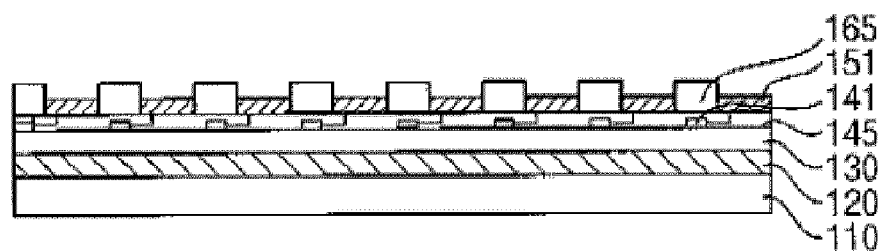
Figure 3H:
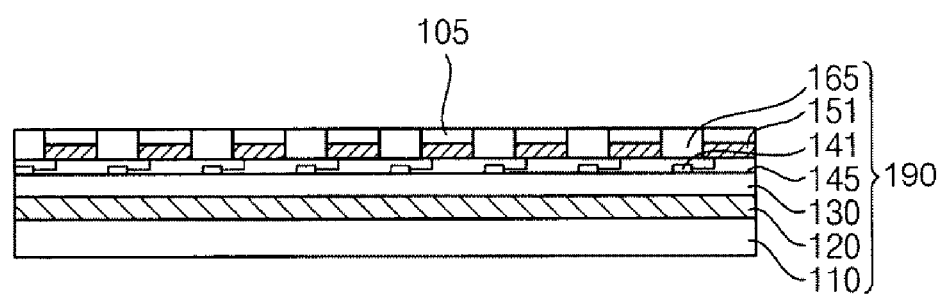
Figure 3I:
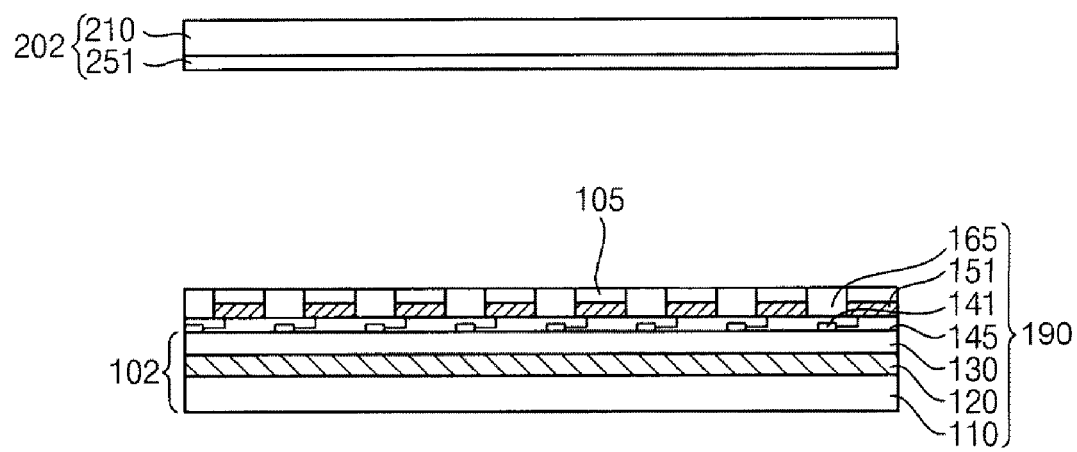
Figure 3J:
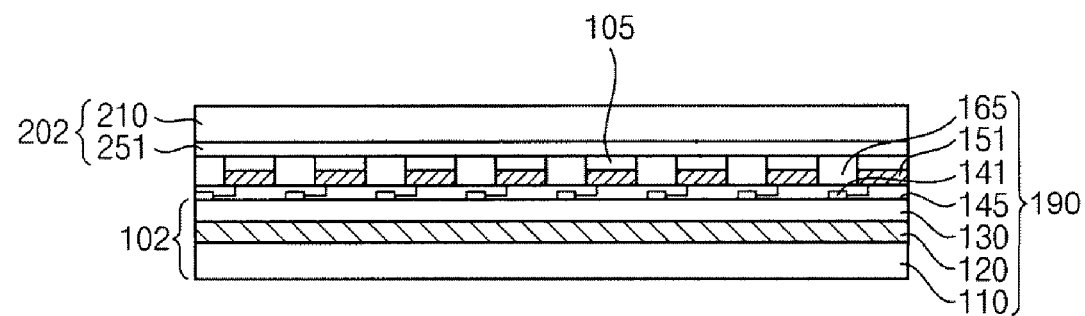

Referring to FIGS. 2 to 3J, the image-emitting panel 101 may include a lower substrate 102, an upper substrate 202 and an electro-optic material layer 105. In order to manufacture the image-emitting panel 190, a light-blocking layer 120 can be formed on a lower base substrate 110 (step S10 in FIG. 2). In general, light-blocking layer 120 may be any material capable of absorbing electromagnetic radiation having a frequency in the visible light range (i.e., electromagnetic waves having a frequency of approximately 430 THz-750 THz). To form the light-blocking layer 120, an organic black matrix, which is used as a light-blocking solution in a liquid crystal display (LCD) device 100, can be deposited on the lower base substrate 110. In some cases, the organic black matrix can have a thickness of approximately 1 µm to approximately 10 µm. In general, various suitable thickness and configurations of the organic black matrix may be used.

The organic black matrix can then be heated at a temperature of approximately 220° C. for about 1 hour to form light-blocking layer 120. It should be appreciated that other settings for the heating temperature and time may be used. Other suitable methods of forming a light-blocking layer 120 may also be employed.

Then, as illustrated in FIG. 3B, an insulation layer may be formed on the light-blocking layer 120 to form a protection layer 130. The protection layer 130 may prevent diffusion of the light-blocking layer 120 and may physically and chemically protect the light-blocking layer 120. The protection layer 130 may be composed of silicon nitride ($SiN_x$) or any suitable material. The protection layer 130 may have a thickness of approximately 0.02 µm to approximately 0.5 µm. In general, various suitable thickness and configurations of the protection layer 130 may be used.

Then, one or more thin-film transistors (TFT) 141 may be formed on the protection layer 130, as illustrated in FIG. 3C. The TFT 141 may be a switching element which controls a pixel of display device 100. In some cases, each pixel of display device 100 can be controlled by a TFT 141. The TFT 141 may be a three-terminal element having a gate electrode connected to a gate line, a source electrode connected to a data line, and a drain electrode connected to a data line. The drain electrode may be spaced apart from the source electrode by the gate electrode. A detailed description of manufacturing the TFT 141 is omitted since the structure and manufacturing process of the TFT 141 is well known to those of skill in the art.

The TFT 141 may be protected by a first insulation layer 145. To form the first insulation layer 145, a transparent conductive material such as indium tin oxide (ITO), indium zinc oxide (IZO), etc., can be deposited at a thickness of approximately 0.02 µm to approximately 0.5 µm. In general, various suitable thickness and configurations of the transparent conductive material may be used. In general, various suitable materials may be used to form the first insulation layer 145.

Alternatively, in some cases, a passive display device may be utilized by omitting the TFT 141.

Next, as illustrated in FIG. 3-D, a plurality of pixel electrodes 151 can be formed and arranged in a matrix on the first insulation layer 145 (step S20 in FIG. 2) of an active display device. The transparent conductive layer used to form the first insulation layer 145 can be etched to form the plurality of pixel electrodes 151. A size of the pixel electrode 151 may be substantially equal to that of a unit cell of the display device 100. In general, various suitable sizes may be used for the pixel electrode.

In some alternative cases, an alignment layer (not illustrated) may be further formed on pixel electrode 151.

In some cases, pixel electrodes 151 may be driven according to a spatial driving method. For example, a first image signal may be applied to pixel electrodes 151 disposed in an odd-numbered row of the pixel matrix, and a second image signal may be applied to pixel electrodes 151 disposed in an even-numbered row of the pixel matrix. The first image signal and the second image signal may be image signals reflecting different viewing angles of the same object.

Display device 100 may further include a driver. The driver may divide the pixel electrodes 151 into multiple groups to apply the first image signal and the second image signal to the pixel electrodes 151 of each of the groups. In some cases, the pixel electrodes 151 may be divided in two groups (e.g., pixels in the odd-numbered rows and pixels in the even-numbered rows). In general, the pixel electrodes 151 may be divided in any suitable number of groups.

Then, as illustrated in FIGS. 3E, 3F, and 3G, a partition wall 165 may be formed between pixel electrodes 151 (step S30 in FIG. 2). For example, as shown in FIG. 3E, a photoresist layer 161 covering pixel electrodes 151 may be formed with a thickness of approximately 3 µm to approximately 10 µm. In general, various suitable thickness and configurations of the photoresist layer 161 may be used.

Then, as shown in FIGS. 3F and 3G, a mask may be arranged on the photoresist layer 161 and a photo etching process may be performed to form the partition wall 165. The photoresist layer 161 formed on the pixel electrode 151 may be partially or completely removed when forming the partition wall 165.

A cholesteric liquid crystal layer 105 containing a cholesteric liquid crystal may subsequently be disposed on the pixel electrodes 151 (step S40 in FIG. 2), as illustrated in FIG. 3H. In general, a cholesteric liquid crystal 105, also shown in FIG. 5, may be a liquid crystal with a helical or chiral structure. Cholesteric liquid crystals may be organized in layers with no positional ordering between the layers. Cholesteric liquid crystal layer 105 may reflect a light, for example, a circularly polarized light that is incident upon upper substrate 202. In some cases, the cholesteric liquid crystal 105 may be a mixture of a nematic host and a chiral dope. A helical structure of the chiral dope may determine a twist direction of the cholesteric liquid crystal 105. For example, a left-handed cholesteric liquid crystal or a right-handed cholesteric liquid crystal may be classified with respect to a twist direction of a spiral shape. Moreover, a density of the chiral dope may determine a wavelength of a reflected polarized light.

A space defined by the pixel electrode 151 and the partition wall 165 may be defined as a cell space. The cell space may have the same twist property of the cholesteric liquid crystal. In order to realize a display color by the display device 100, the chiral dope may be controlled so that the cholesteric liquid crystal layer 105 can reflect a red light, a green light and/or a blue light. Thus, the red, green, and blue color cholesteric liquid crystals may be disposed on the cell space through an inkjet printing method in accordance with a shape of the cell space. The cell space may have any suitable pattern including, for example, a stripe pattern and/or a mosaic pattern.

In step S50, the lower substrate 190 with the plurality of pixel electrodes 151 may be conjoined to the upper substrate 202 as illustrated in FIG. 3I. The upper substrate 202 may include an upper base substrate 210 and an opposing electrode 251. The upper base substrate 202 may be composed of glass material or plastic material such as the lower base substrate 110. The opposing electrode 251 may include, at least partially, a material identical to the pixel electrode 151. In general, various suitable materials may be used for the upper substrate 202 and the opposing electrode 251. The opposing electrode 251 may be formed below the upper base substrate 210. FIG. 3J shows the lower substrate 190 and the upper substrate 202 conjoined.

The method of manufacturing the display device according to exemplary embodiments of the present invention is not limited to the sequence described in FIGS. 2 to 3J. Other modifications of various exemplary embodiments may be possible.

In some exemplary embodiments, a process for forming the pixel electrodes 151 on the light-blocking layer 120 and a process for forming the partition wall 165 between the pixel electrodes 151 may be reversed in sequential order and/or modified. For example, the partition wall 165 may be formed on protection layer 130 before the pixel electrodes are formed. A transparent conductive material layer may be formed on the partition wall 165 and the protection layer 130. The transparent conductive material may be removed on the partition wall 165 so that the pixel electrode 151 may be formed on the protection layer 130.

In some exemplary embodiments, as illustrated in FIG. 3G, the partition wall 165 may be formed in the lower substrate 190. Alternatively, a partition wall 165 may be formed in the upper substrate 202. For example, a photoresist layer 161 may be placed on the opposing electrode 251 of the upper substrate 202. Subsequently, the photoresist layer may be etched or removed so that the partition wall 165 may be formed.

Various methods and devices may be used to dispose or inject the cholesteric liquid crystal layer 105. In some exemplary embodiments, an inkjet printing process may be used. In some cases, a capillary phenomenon may be used to dispose the cholesteric liquid crystal layer 105. In general, any suitable technique may be used to inject the cholesteric liquid crystal layer 105.

Figure 4:
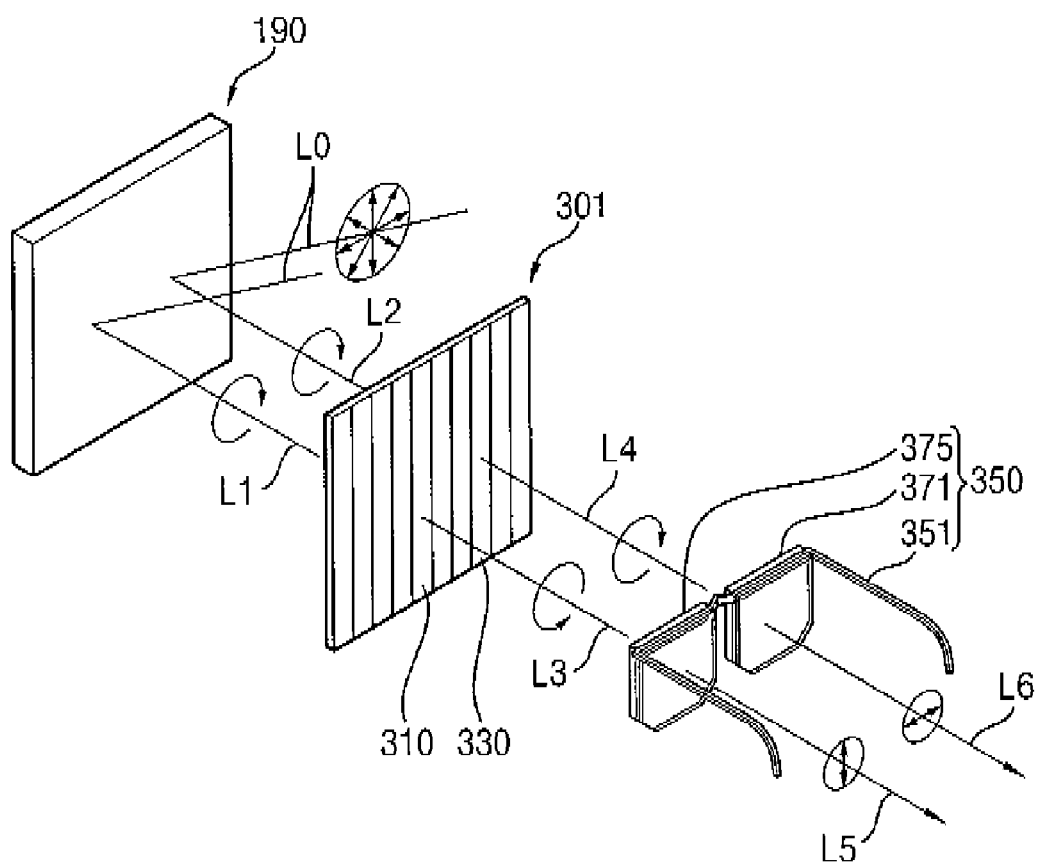
FIG. 4 is a 3-D perspective view schematically illustrating the reflective-type display device shown in 2-D in FIG. 1.
Figure 5:
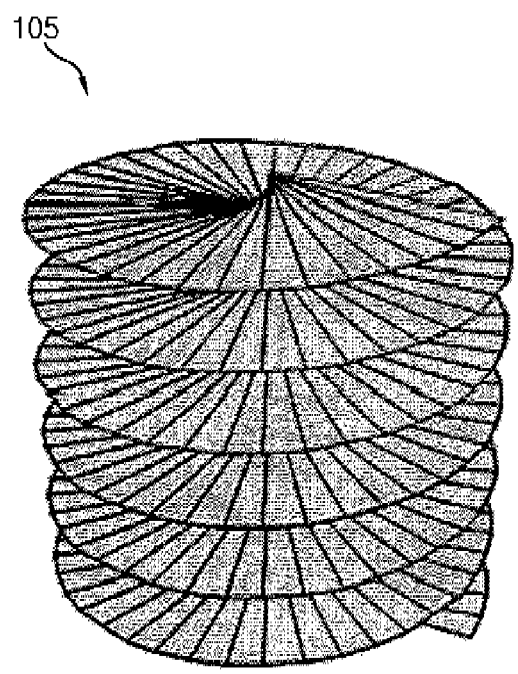
FIG. 5 is a perspective view schematically illustrating a cholesteric liquid crystal of FIG. 1.
Figure 6:
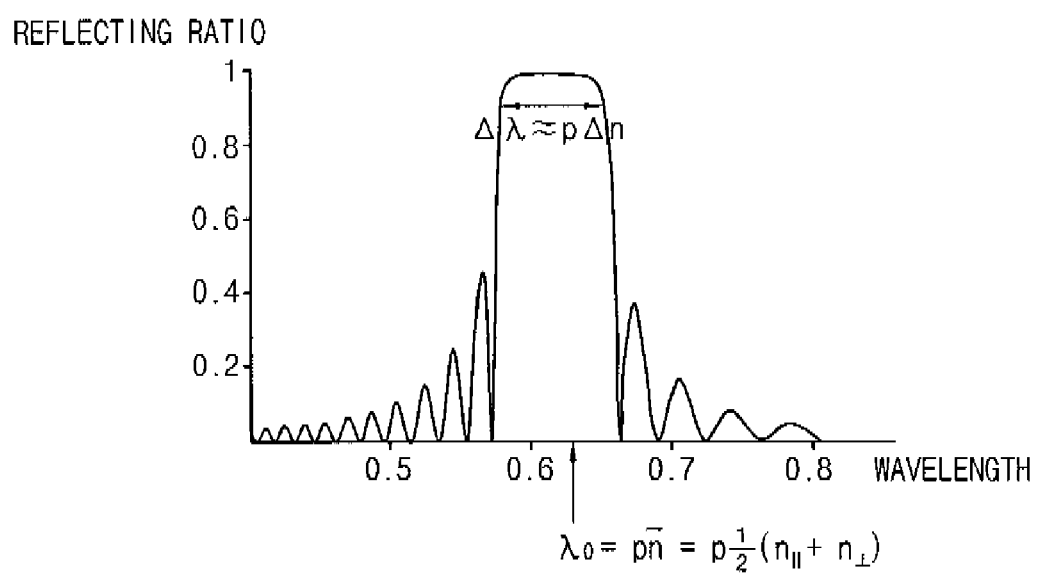
FIG. 6 is a graph illustrating optical reflection characteristics of the cholesteric liquid crystal of FIG. 5.
Figure 7:
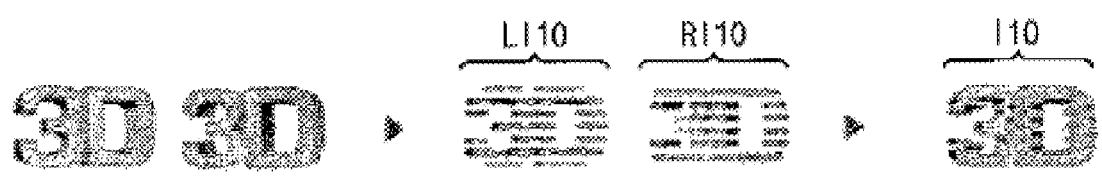
FIG. 7 is an example of a 3-D image produced by the display device of FIG. 4 according to an exemplary embodiment of the invention.

FIG. 4 is a 3-D view schematically illustrating the display device of FIG. 1. FIG. 5 is a perspective view schematically illustrating a cholesteric liquid crystal 105. FIG. 6 is a graph illustrating optical reflection characteristics of the cholesteric liquid crystal of FIG. 5. FIG. 7 is an example of a 3-D image obtained from the display device 100 of FIG. 4.

Referring to FIG. 4, a portion of a natural light or a portion of a non-polarizing light L0 incident through upper substrate 202 can be reflected as reflection lights L1 and L2. Image dividing sheet 301 may divide the circularly polarized lights L1 and L2 into a first light L3 corresponding to the first image signal and a second light L4 corresponding to the second image signal. Image dividing sheet 301 may be attached on the upper substrate 202. Image dividing sheet 301 may be attached on the upper substrate 202. The image-emitting panel 190 and the image dividing sheet 301 may be conjoined.

Polarizing spectacles 350 receive the first image signal and the second image signal. A pixel voltage applied to the pixel electrode 151 may be controlled using the driver, so that a status of the cholesteric liquid crystal 105 and the reflection lights L1 and L2 may be controlled enabling a gradation of an image to be displayed.

Referring to FIGS. 5 and 6, as described above, colors of the reflecting lights L1 and L2 may be varied in accordance with a pitch of the cholesteric liquid crystal 105, so that a density of the chiral dope is controlled to control the pitch. As shown in FIG. 6, the cholesteric liquid crystal 105 may reflect one of circularly polarized lights (i.e., a red light, a green light and blue light) having a predetermined wavelength of incident non-polarized light L0. A center wavelength of the reflection lights L1 and L2 may be determined from a relational expression described in FIG. 6. The left-handed cholesteric liquid crystal 105 may transmit a left-handed circularly polarized light and may reflect a right-handed circularly polarized light of a predetermined wavelength bandwidth. The right-handed cholesteric liquid crystal 105 may transmit a right-handed circularly polarized light and may reflect left-handed circularly polarized light having a predetermined wavelength bandwidth. The cholesteric liquid crystal 105 may reflect at least one of a left-handed circularly polarized light and a right-handed circularly polarized light.

The image dividing sheet 301 may divide the circularly polarized lights L1 and L2 reflected from the image-emitting panel 101 into a first light L3 corresponding to the first image signal and a second light L4 corresponding to the second image signal. The image dividing sheet 301 may be attached on the upper substrate 202. The image-emitting panel 101 and the image dividing sheet 301 may be combined to form the display device 100.

The image dividing sheet 301 may include a first optical element 310 and a second optical element 330 that are alternately arranged thereon. The first optical element 310 may include a liquid crystal layer. Liquid crystal molecules of the liquid crystal layer may be arranged to alter a polarizing axis of an incident light by a half-wavelength (i.e., 180°). For example, if the cholesteric liquid crystal 105 is a left-handed cholesteric liquid crystal 105, a right-handed circularly polarized light L1 incident to the first optical element 310, which corresponds to the first image signal, may be converted into a left-handed circularly polarized light L1 by the first optical element 310. The left-handed circularly polarized light emitted from the first optical element 310 may be defined as a first light L3. A right-handed circularly polarized light L2 incident to the second optical element 330, which corresponds to the second image signal, may pass the second optical element 330 without converting. The right-handed circularly polarized light passing the second optical element 330, which corresponds to the second image signal, may be defined as a second light L4.

Referring to FIGS. 4 and 7, display device 100 may further include polarizing spectacles 350. The polarizing spectacles 350 may include a first polarizing plate 375 that may be attached to a left eye side of the polarizing spectacles 350 and a second polarizing plate 371 that may be attached to a right eye side of the polarizing spectacles 350. A polarizing axis of the first polarizing plate 375 may be perpendicular to the polarizing axis of the second polarizing plate 371. The first light L3 may be linearly polarized by the first polarizing plate 375 and may be converted into a first image light L5 having a polarizing axis of about 0 degree. The second light L4 can be linearly polarized by the second polarizing plate 371 and can be converted into a second image light L6 having a polarizing axis of about 90 degrees.

When the first image light L5 is incident to a left eye side, a left image LI10 illustrated in FIG. 7 may be detected by the left eye of a viewer. When the second image light L6 is incident to a right eye side, a right image RI10 illustrated in FIG. 7 may be detected by the right eye of a viewer. As a result, the viewer may recognize a 3-D image 110 as illustrated in FIG. 7. That is, the display device 100 displays a 3-D image thereon by reflecting and polarizing an external light.

Figure 8:
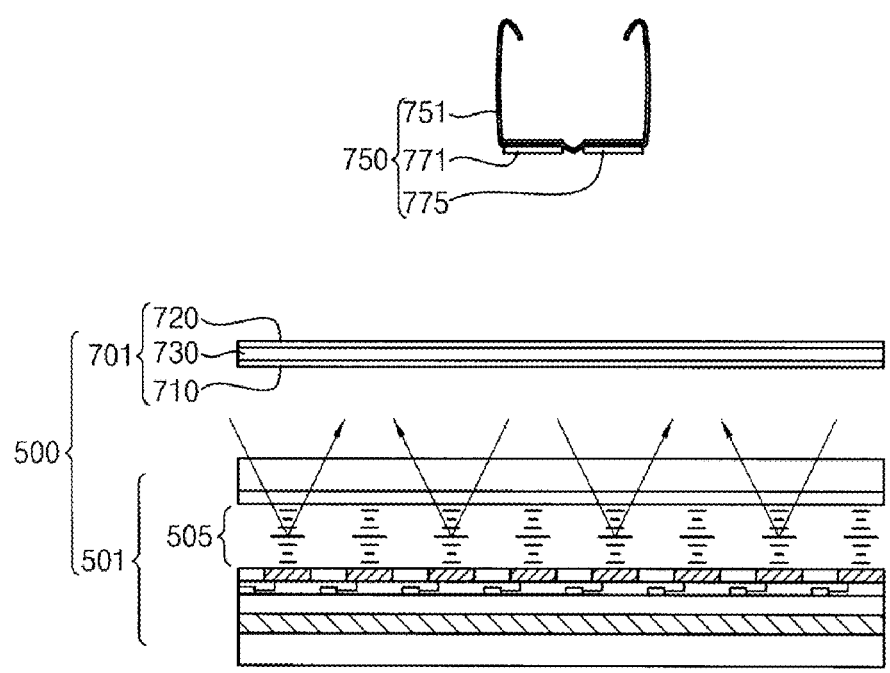
FIG. 8 is a cross-sectional view of a display device according to an exemplary embodiment of the invention.
Figure 9:
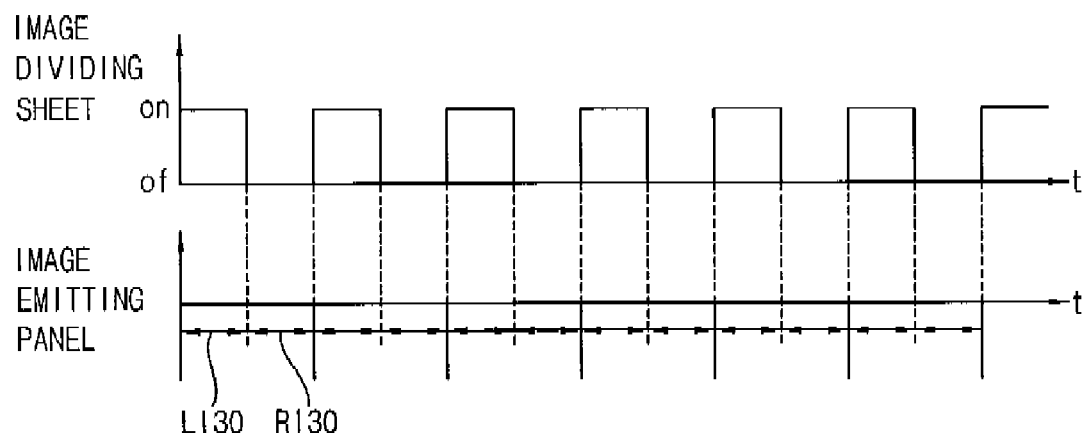
FIG. 9 is waveform diagram corresponding to an operation of the display device of FIG. 8 according to an exemplary embodiment of the invention.

FIG. 8 is a cross-sectional view of a display device 500 according to some exemplary embodiments of the invention. FIG. 9 is a waveform diagram corresponding to an operation of display device 500 in FIG. 8.

Referring to FIG. 8, a display device 500 may include an image-emitting panel 501 and an image dividing sheet 701.

The image-emitting panel 501 is substantially the same as the image-emitting panel 190 of FIG. 1 except for the driving method. Accordingly a detailed description of the image-emitting panel 501 will be omitted; however the driving method shall be described in greater detail below.

As illustrated in FIG. 9, the first image signal and the second image signal having different viewing angles of the same object, respectively, may be alternately applied to the pixel electrodes 551 in a temporal dividing method. For example, a first image signal may be applied to the pixel electrodes 551 for a (N)-th frame, and a second image signal may be applied to the pixel electrodes 551 for a (N+1)-th frame The image-emitting panel 501 may include at least one of a left-handed cholesteric liquid crystal and a right-handed cholesteric liquid crystal. A circularly polarized light reflected by the cholesteric liquid crystal 505 may be controlled to display an image of a gradation according to the controlled amount of light of the first image signal and the second image signal. A red light, a green light and a blue light may be reflected in accordance with characteristics of the cholesteric liquid crystal 505 to display a color image. The image-emitting panel 501 may reflect a circularly polarized light corresponding to the different images in a different time.

According to the exemplary embodiments illustrated in FIG. 8, the image dividing sheet 701 may convert a circularly polarized light corresponding to the first image signal into a first light, and may convert a circularly polarized light corresponding to the second image signal into a second light having a difference phase with respect to the first light. The image dividing sheet 701 may include a lower electrode 710 and an upper electrode 720 facing the lower electrode 710. The upper electrode 720 may be opposite to the lower electrode. A liquid crystal layer 730 may be interposed between the lower electrode 710 and the upper electrode 720.

As illustrated in FIG. 9, an on signal may be applied to the lower electrode 710 and the upper electrode 720 in synchronization with an applying period of the first image signal. When the lower electrode 710 and the upper electrode 720 may be turned on, for example, in response to an electric field, the liquid crystal layer 730 may invert a phase of the circularly polarized light as a first light signal. When an electric field may not be applied thereto, the liquid crystal layer 730 may maintain the polarization of the circularly polarized light to pass the circularly polarized light as a second light signal.

That is, the image dividing sheet may be a half-wavelength phase difference shutter which is periodically on and off.

Polarizing spectacles 750 may be substantially identical to the polarizing spectacles 350 as described in FIG. 1 to 7. The first light may pass the first polarizing plate 775 of a left eye side of the polarizing spectacles 750 to be converted into a first image light. The second light may pass a second polarizing plate 771 of a right eye side of the polarizing spectacles 750 to be converted into a second image light having a polarizing axis perpendicular to the first image light. The first and second image lights may be incident to left eye and right eye of viewer, so that a 3-D image may be recognized.

A manufacturing method of the display device 500 according to an exemplary embodiment is substantially the same as the manufacturing method of the display device 100, which is described in FIGS. 3A to 3J. Thus, a detailed description thereof will be omitted.

Figure 10:
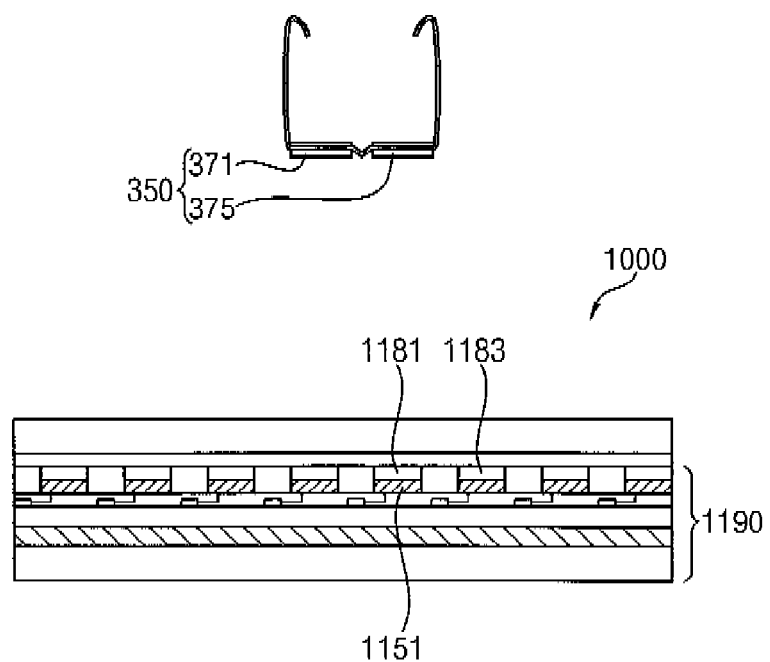
FIG. 10 is a cross-sectional view of a display device according to an exemplary embodiment of the invention.

FIG. 10 is a cross-sectional view of a display device 1000 according to some exemplary embodiments of the invention.

Referring to FIG. 10, display device 1000 is substantially the same as display device 100 described in FIGS. 1 to 7 except for the image dividing sheet, which may not be part of the display device 1000 in some exemplary embodiments. FIG. 10 illustrates an example in which a left-handed cholesteric liquid crystal 1181 and a right-handed cholesteric liquid crystal 1183 may be alternately arranged in each of cell spaces of the lower substrate 1190.

A first image signal may be applied to a pixel electrode 1151 in which the left-handed cholesteric liquid crystal 1181 is disposed. A second image signal may be applied to a pixel electrode 1151 in which the right-handed cholesteric liquid crystal 1183 is disposed. Thus, a right-handed circularly polarized light signal which is reflected by the left-handed cholesteric liquid crystal 1181 may correspond to the first image signal. A left-handed circularly polarized light signal which is reflected by the right-handed cholesteric liquid crystal 1183 may correspond to the second image signal. Therefore, the image-emitting panel may provide the left-handed circularly polarized light and the right-handed circularly polarized light, enabling omission of an image dividing sheet in display device 1000.

A method of manufacturing the display device 1000 according to an exemplary embodiment is substantially the same as the method of manufacturing the display device 100 described in FIGS. 3A to 3J except that the left-handed cholesteric liquid crystal 1181 and the right-handed cholesteric liquid crystal 1183 can be alternately disposed in the cell space.

In order to manufacture display device 1000, one of the left-handed cholesteric liquid crystal 1181 or the right-handed cholesteric liquid crystal 1183 can be printed on the cell space through an inkjet printing method in accordance with a pattern of the cell space. Any suitable pattern may be used, including, for example, a stripe pattern and/or a mosaic pattern. The remaining left-handed cholesteric liquid crystals or the right-handed cholesteric liquid crystals may be printed on the remaining cell space through an inkjet printing method.

Accordingly, exemplary embodiments of the present invention may be employed for a reflection-type 3-D display device and a method of manufacturing the same by using cholesteric liquid crystals. A 3-D display device having a small volume, a small weight, a small thickness and low power consumption is provided herein.

The foregoing is illustrative of embodiments of the invention and is not to be construed as limiting thereof. Although a few exemplary embodiments of the invention have been described, those skilled in the art will readily appreciate that many modifications are possible in the exemplary embodiments without materially departing from the scope or spirit of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device for displaying an image, the display device comprising:
   a first panel comprising:
      a light-blocking layer;
      a lower substrate disposed on the light-blocking layer, the lower substrate comprising a plurality of pixel electrodes to which a first image signal and a second image signal are applied in a spatial dividing method, wherein the first image signal corresponds to a first viewing angle of the image and the second image signal corresponds to a second viewing angle of the image, the second viewing angle being different than the first viewing angle;
      an upper substrate comprising an opposing electrode being opposite to the plurality of pixel electrodes; and
      an electro-optic layer arranged between the plurality of pixel electrodes and the opposing electrode, the electro-optic layer to reflect a polarized light signal; and
   a second panel to receive the reflected polarized light signal, the second panel comprising:
      a first optical element to convert the reflected polarized light signal into a first light corresponding to the first image signal; and
      a second optical element being alternately arranged relative to the first optical element, the second optical element to convert the reflected polarized light signal into a second light corresponding to the second image signal.

2. The display device of claim 1, wherein the electro-optic layer comprises at least one of a cholesteric liquid crystal to reflect a right-handed circularly polarized light and a cholesteric liquid crystal to reflect a left-handed circularly polarized light.

3. The display device of claim 2, wherein the first optical element comprises a liquid crystal layer to modify a phase of the polarized light signal by 180 degrees.

4. The display device of claim 3, further comprising polarizing spectacles comprising:
   a first polarization plate to linearly polarize the left-handed circularly polarized light to provide the first image light corresponding to the first image signal: and
   a second polarizing plate to linearly polarize the right-handed circularly polarized light to provide the second image light corresponding to the second image signal.

5. The display device of claim 4, wherein the first image light is incident to a left eye side of the polarizing spectacles, and the second image light is incident to a right eye side of the polarizing spectacles.

6. The display device of claim 2, wherein the lower substrate further comprises:
   a base substrate coupled to the light-blocking layer;
   a protection layer coupled to the light-blocking layer; and
   a thin-film transistor layer comprising a plurality of thin-film transistors, the thin film transistor layer being situated between the protection layer and the plurality of pixel electrodes, the plurality of thin-film transistors being electrically connected to the plurality of pixel electrodes.

7. The display device of claim 2, further comprising:
   a driver to control the first image signal, the second image signal, and a reflection of the reflected polarized light.

8. A display device for displaying an image, the display device comprising:
   a first panel comprising:
      a light-blocking layer;
      a lower substrate disposed on the light-blocking layer, the lower substrate comprising a plurality of pixel electrodes to which a first image signal and a second image signal are applied in a temporal dividing method, wherein the first image signal corresponds to a first viewing angle of the image and the second image signal corresponds to a second viewing angle of the image, the second viewing angle being different than the first viewing angle;
      an upper substrate comprising an opposing electrode being opposite to the plurality of pixel electrodes; and
      an electro-optic layer arranged between the plurality of pixel electrodes and the opposing electrode, the electro-optical layer to reflect a polarized light signal; and
   an image dividing sheet to convert a circularly polarized light corresponding to the first image signal into a first light, and to convert a circularly polarized light corresponding to the second image signal into a second light, a phase of the second light being different from a phase of the first light.

9. The display device of claim 8, wherein the electro-optic layer comprises at least one of a cholesteric liquid crystal to reflect a right-handed circularly polarized light and a cholesteric liquid crystal to reflect a left-handed circularly polarized light.

10. The display device of claim 9, wherein the image dividing sheet comprises:
    a lower electrode;
    an upper electrode; and
    a liquid crystal layer arranged between the lower electrode and the upper electrode, the liquid crystal layer to invert, in a first state, a phase of the circularly polarized light and the liquid crystal layer to provide, in a second state, the circularly polarized light as the second light.

11. The display device of claim 10, further comprising polarizing spectacles comprising:
    a first polarization plate to linearly polarize the left-handed circularly polarized light to provide a first image light corresponding to the first image signal; and
    a second polarizing plate to linearly polarize the right-handed circularly polarized light to provide a second image light corresponding to the second image signal.

12. A method of manufacturing a display device, the method comprising:
    disposing a light-blocking layer on a base substrate;
    disposing a plurality of pixel electrodes to which a first image signal and a second image signal are applied in a spatial dividing method on the light-blocking layer, wherein the first image signal corresponds to a first viewing angle of the image and the second image signal corresponds to a second viewing angle of the image, the second viewing angle being different than the first viewing angle;

preparing an upper substrate comprising an opposing electrode being opposite to the pixel electrodes;

arranging an electro-optic layer between the pixel electrodes and the opposing electrode to complete a first panel, the electro-optic layer reflecting a polarized light signal; and disposing a second substrate receiving the reflected polarized light signal on the first substrate, the second substrate comprising:
  a first optical element to convert the reflected polarized light signal into a first light corresponding to the first image signal; and
  a second optical element being alternately arranged relative to the first optical element, the second optical element converting the reflected polarized light signal into a second light corresponding to the second image signal.

13. The method of claim 12, wherein the electro-optic layer comprises at least one of a cholesteric liquid crystal to reflect a right-handed circularly polarized light and a cholesteric liquid crystal to reflect a left-handed circularly polarized light.

14. The method of claim 13, wherein the first optical element comprises a liquid crystal layer to modify a phase of the polarized light signal by 180 degrees.

15. The method of claim 14, wherein the liquid crystal layer comprises a left-handed cholesteric liquid crystal and a right-handed cholesteric liquid crystal,
  wherein disposing the left-handed cholesteric liquid crystal and the right-handed cholesteric liquid crystal comprises using an inkjet printing process and/or a capillary phenomenon.

16. The method of claim 12, wherein disposing the plurality of pixel electrodes comprises:
  disposing a transparent conductive layer on the base substrate on which a partition wall arranged in an area corresponding between the pixel electrodes; and
  selectively removing the transparent conductive layer on the partition wall.

17. The method of claim 16, wherein arranging the partition wall comprises:
  disposing a photoresist layer to cover the opposing electrode and the pixel electrodes; and
  selectively removing the photoresist layer.

18. The method of claim 12, further comprising:
  disposing a protection layer on the light-blocking layer before the pixel electrodes is disposed; and
  arranging on the protection layer, a thin-film transistor layer comprising a plurality of thin-film transistors coupled to the pixel electrodes.

* * * * *